March 18, 1969    F. HACH, JR    3,433,418
CUTTING TORCH TIP ASSEMBLY
Filed Nov. 3, 1966
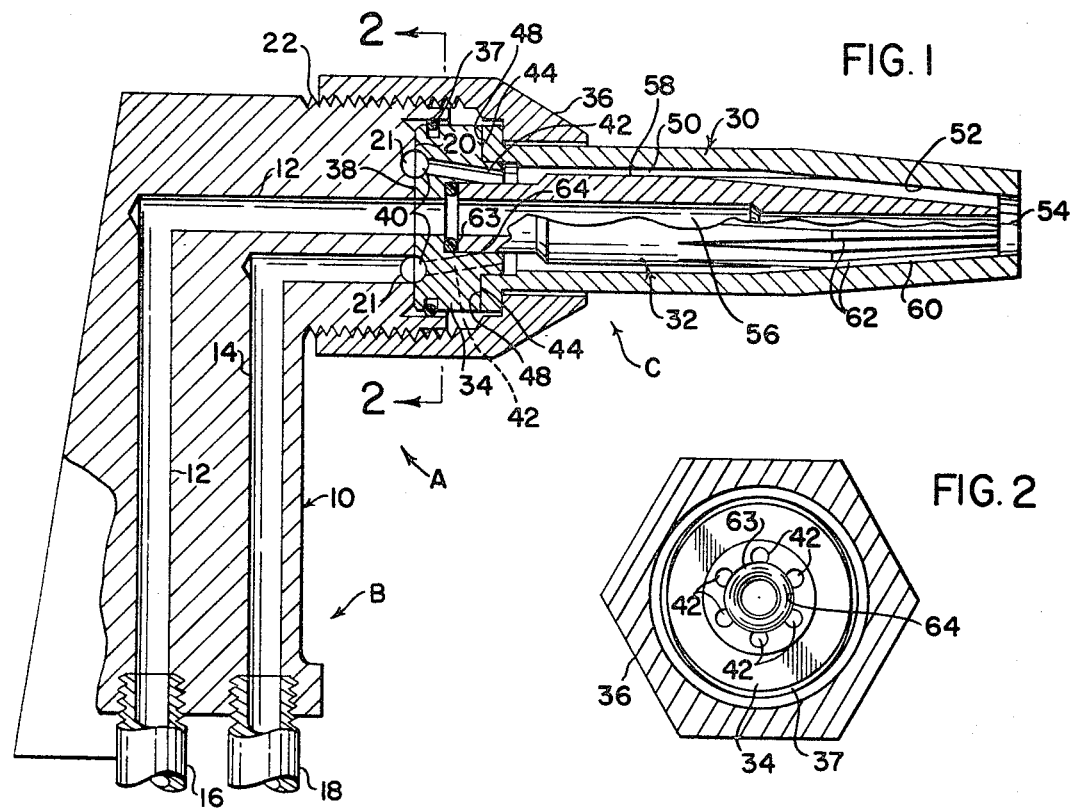
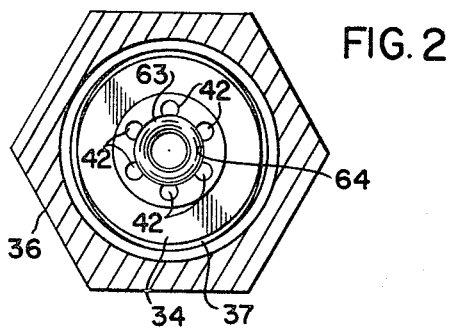
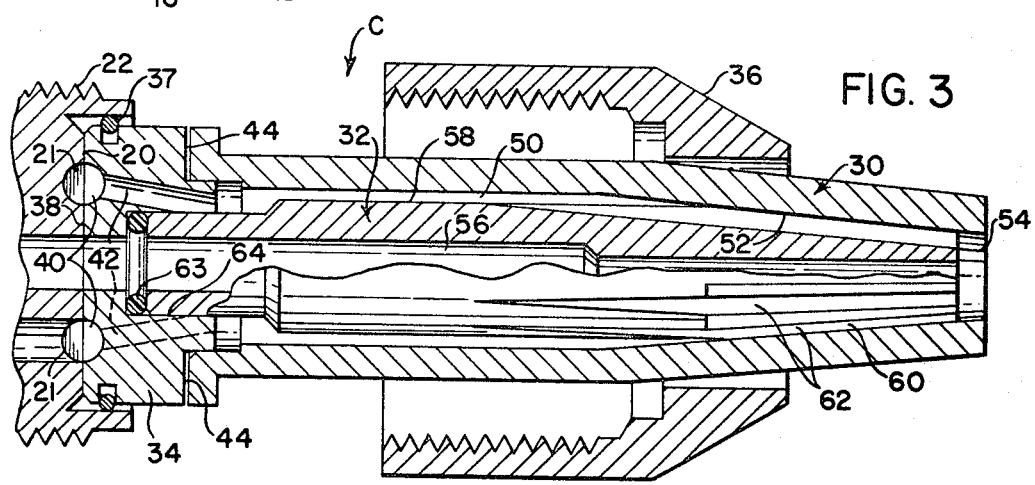
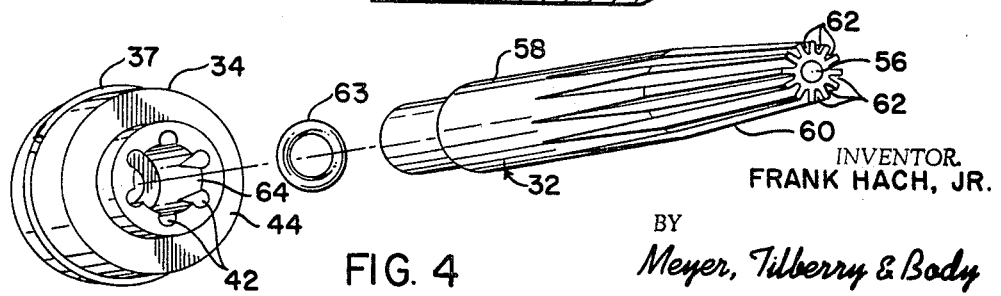
INVENTOR.
FRANK HACH, JR.
BY
*Meyer, Tilberry & Body*
ATTORNEYS United States Patent Office 3,433,418
Patented Mar. 18, 1969

3,433,418
CUTTING TORCH TIP ASSEMBLY
Frank Hach, Jr., Euclid, Cuyahoga, Ohio, assignor to The Harris Calorific Company, Cleveland, Ohio, a corporation of Ohio
Filed Nov. 3, 1966, Ser. No. 591,754
U.S. Cl. 239—422          1 Claim
Int. Cl. B05b 7/06; F23d 11/00

ABSTRACT OF THE DISCLOSURE

A torch tip assembly for connection to a torch head comprising a generally cylindrical distribution member having a first end face and a second end face. A circular opening of uniform diameter is formed axially of the member in the first end face. A second opening of smaller diameter than the first opening extends axially through the member from the bottom of the first opening to the second end face with the juncture between the first and second openings defining a circular shoulder. A resilient annular ring member is positioned in the first opening and is in engagement with the shoulder. An elongated tip insert member of generally circular cross-section having an axial bore extending therethrough and a first end portion terminating in an end wall and a uniformly tapered second end portion is axially slidably received in the first opening with the end wall being in engagement with the ring member. A tip shell member is positioned about the tip insert member and has its outlet end tapered to generally conform to the taper of the insert member. The shell member has its inlet end releasably engaged with the distribution member and functions in cooperation with the distribution member to support the insert at its opposite ends. The fact that the tip insert is supported entirely by the cooperation of these two members and the addition of the resilient annular ring member eliminate the need for holding close tolerances in the manufacture of the insert.

---

The present invention is directed to the art of gas cutting torches and, more particularly, to an improved tip assembly for a cutting torch.

Generally, gas cutting torches comprise a head portion provided with a pair of internal passageways, one adapted to be supplied with a mixture of oxygen and fuel gas, and the other with pure oxygen. A tip assembly is mounted on the head portion and comprises a cylindrical outer shell having an internal passage extending therethrough, and a tip insert coaxially positioned in the passage. Normally, the internal passage of the shell is tapered adjacent its outlet end, and the external surface of one end of the tip insert is similarly tapered with a plurality of passageway forming grooves formed therein. The remaining length of the insert is of a diameter less than the internal diameter of the shell passage to thereby form an annular chamber or passage between the shell and the insert. The oxygen and fuel gas mixture passageway of the torch head is connected to the annular chamber, while the oxygen passageway is connected to the head end of the passageway formed in the tip insert. The oxygen and gas thus flows through the annular chamber and the grooves formed in the external surface of the tip insert to the outlet end of the shell where it burns to provide the necessary preheat flame. The oxygen passes through the opening formed centrally of the insert to the outlet end of the shell where it contacts the preheated material to produce burning and, consequently, cutting.

Heretofore, the head or upper end of the insert was provided with a radially extending machined flange. This flange mated with both the head and the upper end of the shell with a gas tight seal.

The provision of this flange required the stock piece from which the part was machined to be much larger than the main portion of the tip insert. Consequently, a large amount of material had to be removed in the form of machining scrap. Additionally, the length of the tip insert portion had to be held to extremely close tolerances. As can be seen, if the tip insert was too long, binding resulted between the taper of the insert and the internal taper of the shell. Alternately, if the insert was too short, an excessive gap was present resulting in a fuzzy, poorly defined, preheat flame.

The above discussed material and machining factors result in relatively expensive tip inserts. Also, the flanged ends of such inserts are easily damaged by dropping or mishandling.

The present invention provides a torch tip construction which eliminates the previously discussed flange and its attendant problems, and permits the tip insert to be formed from a stock piece of a smaller diameter substantially equal to the main portion of the tip insert. Further, the length of the tip insert is no longer critical, eliminating the necessity of holding the tolerances as closely as previously required.

In accordance with the present invention, a torch tip assembly of the general type described is provided comprised of means intermediate the torch head and the tip insert forming an opening of a diameter slightly larger than the head end of the insert. A resilient sealing means is positioned in the opening and the head end of the insert extends into the opening into engagement with the resilient sealing means.

A primary object of the present invention is the provision of a torch tip assembly which reduces the amount of material and machining required to form the tip insert.

Another object is the provision of a torch tip assembly which compensates for variations in the length of the tip insert member, while still assuring a zero clearance fit of the tip with its outer shell.

A further object is the provision of a torch tip assembly that permits the tip insert member to be formed from a stock piece of a diameter substantially equal to the final diameter of the main body portion of the tip insert.

Yet another object is the provision of a torch tip assembly which can be readily disassembled.

A still further object is the provision of a torch tip assembly that is cheaper to produce than previous assemblies.

These and other objects and advantages will become apparent from the following description used to illustrate the preferred embodiment of the invention as read in connection with the accompanying drawings in which:

FIGURE 1 is a longitudinal cross-sectional view of a torch constructed in accordance with preferred embodiment of the present invention, FIGURE 2 is a cross-sectional view taken on line 2—2 of FIGURE 1, FIGURE 3 is an enlarged cross-sectional view of the tip assembly portion of the torch, FIGURE 4 is an exploded pictorial view showing the relationship of certain of the elements of the present invention.

Referring now to the drawings wherein the showings are for the purpose of illustrating a preferred embodiment of the invention only and not for the purpose of limiting the same, FIGURE 1 shows the overall relationship of torch A comprising head portion B and tip assembly C.

The actual arrangement of head portion B is not material to the present invention. However, as shown in FIGURE 1, head portion B comprises a main body 10, formed such as by casting or forging, and provided with a pair of internal passageways 12 and 14. These passageways would normally be respectively communicated with a source of pure oxygen and an oxygen and fuel gas mixture by pipes or hoses 16 and 18 threaded into the bottom of body 10. Passageways 12 and 14 terminate in a machined face surface 20 provided with an annular distribution groove 21. The end of body portion 10 is threaded at 22 to provide means for conveniently attaching tip assembly C.

Tip assembly C comprises a tip shell 30, a coaxial tip insert 32, and a distribution member 34. These members are maintained snugly in engagement with one another and with the machined face surface 20 of the body portion 10 by a nut 36 releasably engaged with thread portion 22 of body 10.

Positioned intermediate the tip shell and the torch head is distribution member 34. This member could, of course, be formed by means integral with torch head portion B. However, as shown, it comprises a cylindrical body received in an opening formed in the end of body 10. A circumferentially extending groove is formed in the external surface of distribution member 34. Positioned within this groove and serving to frictionally maintain the distribution member in the opening in body 10 is a spring ring 37. A face surface 38 is machined on the distribution member to provide a sealing fit with face surface 20 of body 10. An annular groove 40 is formed in face surface 38 at a location corresponding to annular groove 21 of body 10. These grooves 40 and 21 cooperate to form a passage for supplying the oxygen and fuel gas coming from passageway 14 through openings 42 into the annular chamber formed between tip insert 32 and tip shell 30. The right hand end of distribution member 34 likewise has a machined surface 44 which cooperates with a corresponding machined surface 48 formed on the end of tip shell 30.

Tip shell 30 comprises an elongated cylindrical member having a passageway extending longitudinally therethrough. A first portion 50 of the passageway is of generally uniform circular cross section. A second portion 52 is likewise of circular cross section, but of constantly decreasing diameter to outlet 54.

Positioned within the longitudinal passageway of shell 30 is a tip insert 32. As best shown in FIGURE 4, insert 32 comprises an elongated body portion of generally circular configuration having a central opening or passageway 56 formed axially therethrough. As seen in FIGURES 1 and 3, this opening serves to communicate passageway 12 with outlet 54. The exterior surface of insert 32 is formed to provide a uniform diameter portion 58 and a tapered end portion 60. The diameter of portion 58 is such as to provide an annular chamber between the insert and portion 50 of the shell passageway. End portion 60 of insert 32 has a taper corresponding to the internal taper 52 of shell 30. Means are provided to communicate the annular chamber with outlet 54. These means comprise a plurality of radially spaced slots or grooves 62 formed in the outer surface of insert 32. As can be seen, the oxygen and fuel gas mixture supplied through passageway 14 is communicated through the distribution member 34 to the annular chamber by the passageways 42. From the annular chamber the mixture then flows through grooves 62 to outlet opening 54 where it burns in a sharp, well defined, preheat flame.

Of particular importance to the present invention is the mounting arrangement for the left or entrant end of tip insert 32. As previously discussed, in the past these inserts were provided with machined flanges which extended outwardly and permitted the insert to be held between the torch head and the inner end of the tip shell. However, as can be readily visualized, this required that the piece of stock from which the insert was machined have a diameter equal to the diameter to the flange. This resulted in substantial losses in material and machining time. Additionally, the length of the insert between the flange and the outer end had to be held to extremely close tolerances to assure the proper fit between the tapered end of the insert and the internal taper of the shell. The present arrangement overcomes these problems by providing a novel configuration and mounting arrangement for the tip insert.

As can be seen, the left end of tip insert 32 is of slightly reduced diameter and is closely received in an opening 64 formed in distribution member 34. Positioned between the bottom wall or shoulder of the opening and the left end wall or face of tip insert 32 is a resilient member 63. This member could take a variety of configurations and be formed from many different materials, however, in the preferred embodiment it comprises a high temperature resistant O ring formed from a material such as silicone rubber. As is apparent, this member serves as a seal between distribution member 34 and the tip insert 32 and additionally permits the length of tip insert 32 to vary slightly and still provide zero clearance fit with the tip shell 30. For example, if tip insert 32 is machined slightly overlong, member 63 will be compressed thus preventing binding between tapered surface 60 and the internal tapered surface 52 of the tip shell. Additionally, since this ararngement does not require a large flange portion on the end of the tip insert, the insert can be machined from a piece of stock of the diameter approximately equal to the diameter of portion 58. Further, the present arrangement does not require the use of snap rings or other shoulder or flange-forming elements. This results in a substantial saving of material and simplification of the torch tip.

The invention has been described in great detail sufficient to enable one skilled in the art of torches to duplicate the invention. Obviously, modifications and alterations of the preferred embodiment described will occur to others upon a reading and an understanding of this specification, and it is my intention to include all such modifications and alterations as part of my invention insofar as they come within the scope of the appended claim.

Having thus described my invention, I claim:

1. A torch tip assembly adapted to be connected to a torch head, said assembly comprising:
    a generally cylindrical distribution member having a first end face and a second end face,
    a circular opening of uniform diameter formed axially of said member in said first end face,
    a second opening of smaller diameter than said first opening extending axially through said member from the bottom of said first opening to said second end face with the juncture between said first and second openings defining a circular shoulder, a resilient annular ring member positioned in said first opening and in engagement with said shoulder,
    an elongated tip insert member of generally circular cross-section having an axial bore extending therethrough and a first end portion terminating in an end wall and a uniformly tapered second end portion, said first end portion being of a uniform diameter slightly less than the diameter of said first opening and being axially slidably received in said first opening with said end wall being in engagement with said ring member,
    an elongated tip shell member having a central axial opening extending from an inlet end to an outlet end, substantially larger than said insert from said inlet end to a point adjacent said outlet end and tapering from said point to said outlet at an angle substantially corresponding to the angle of taper of the second end portion of said insert, said shell member having its inlet end releasably engaged with said distribution member and surrounding said insert member whereby said insert is supported between said second opening and said tapered end portion of said axial opening.

References Cited

UNITED STATES PATENTS 2,335,330  11/1943  Wigton _____ 158—27.4 X
2,614,616  10/1952  Villoresi et al. _____ 158—27.4
2,881,826  4/1959  Spies _____ 239—600 X EVERETT W. KIRBY, *Primary Examiner.*

U.S. Cl. X.R.

239—424.5, 430